US011836411B2

(12) United States Patent
Liu

(10) Patent No.: US 11,836,411 B2
(45) Date of Patent: *Dec. 5, 2023

(54) METHOD AND SYSTEM FOR VIEW SHARING OF DIGITAL FILES

(71) Applicant: SINGULARITY AI, INC., San Jose, CA (US)

(72) Inventor: Bin Liu, Campbell, CA (US)

(73) Assignee: Singularity AI, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/547,601

(22) Filed: Dec. 10, 2021

(65) Prior Publication Data

US 2023/0185511 A1    Jun. 15, 2023

Related U.S. Application Data

(63) Continuation of application No. 17/547,508, filed on Dec. 10, 2021.

(51) Int. Cl.
  *G06F 3/14* (2006.01)
  *H04N 13/106* (2018.01)
  *G06T 3/40* (2006.01)
  *G06F 16/182* (2019.01)

(52) U.S. Cl.
  CPC .......... *G06F 3/1454* (2013.01); *G06F 16/182* (2019.01); *G06T 3/40* (2013.01); *H04N 13/106* (2018.05)

(58) Field of Classification Search
  CPC ........ G06F 16/182; G06F 3/1454; G06T 3/40
  See application file for complete search history.

(56) References Cited

U.S. PATENT DOCUMENTS 6,839,880 B1 * 1/2005 Morse ................... G06Q 50/16
                                                              715/205
2005/0273458 A1 * 12/2005 Adams .................. G06Q 30/02
(Continued)

OTHER PUBLICATIONS

Non-Final Office Action dated Jan. 5, 2023, issued in related U.S. Appl. No. 17/547,508 (19 pages).
(Continued)

*Primary Examiner* — Samantha (Yuehan) Wang
(74) *Attorney, Agent, or Firm* — Sheppard Mullin Richter & Hampton LLP

(57) ABSTRACT

Methods, systems, and apparatuses, including computer programs encoded on computer storage media, for sharing views of large digital files are described. An example method includes generating a plurality of content blocks of a digital file and uploading the plurality of content blocks to one or more servers for storage; determining one or more of the plurality of content blocks representing a view of the digital file to share with one or more viewer computer devices; transmitting storage addresses of the one or more determined content blocks to the one or more viewer computer devices; executing one or more host commands to the one or more determined content blocks on the host computer device for managing the view of the digital file; and transmitting the one or more host commands to the one or more viewer computer devices for execution.

18 Claims, 9 Drawing Sheets

(56) References Cited

U.S. PATENT DOCUMENTS

2014/0375648 A1* 12/2014 Katakawa .................. G06T 1/20
                                                    345/428
2017/0142076 A1*  5/2017 Ford ..................... H04L 63/061
2017/0185575 A1*  6/2017 Sood ..................... G06F 40/169
2018/0205797 A1*  7/2018 Faulkner ................ H04L 67/14

OTHER PUBLICATIONS

PCT International Search Report and the Written Opinion dated Feb. 8, 2023, issued in related International Application No. PCT/US2022/052289 (16 pages).

* cited by examiner

500

- 510: receiving, by a viewer computer device from a host computer device, one or more storage addresses of one or more content blocks representing a view of a digital file, wherein the one or more storage addresses correspond to the one or more content blocks in a server, and the one or more content blocks are a subset of a plurality of content blocks generated based on the digital file

- 520: retrieving, by the viewer computer device from the server, the one or more content blocks based on the one or more storage addresses

- 530: receiving, by the viewer computer device from the host computer device, one or more host commands executed on the host computer device for managing a view of the digital file

- 540: executing, by the viewer computer device, the one or more host commands on the one or more retrieved content blocks for synchronizing the view of the digital file between the viewer computer device and the host computer device

FIG. 5

METHOD AND SYSTEM FOR VIEW SHARING OF DIGITAL FILES

CROSS REFERENCE TO RELATED APPLICATION

The present application is a continuation of U.S. patent application Ser. No. 17/547,508, filed on Dec. 10, 2021, and entitled "Method and System for View Sharing of Digital Files", the content of which is hereby incorporated by reference in its entirety.

TECHNICAL FIELD

The disclosure generally relates to systems and methods for view sharing of digital files, specifically, for online communication involving synchronously sharing views of ultra-high resolution images, slides, videos, virtual tours between a host device and one or more viewer devices.

BACKGROUND

Through the development of Internet technologies in recent years, real-time or near real-time view sharing (such as screen sharing in an online meeting) of images, videos, or other digital files between a host device and one or more remote viewer devices have become increasingly popular and important in many practical scenarios, such as teachers teaching remote students, companies presenting to investors, remote meetings, host-led virtual tours (museum/real-estate), etc. During view sharing, the host and one or more viewers may view the same presentation/view of a digital file in a synchronized way.

In general, there are two types of existing technologies for view sharing. First, commercial live-meeting platforms such as Zoom, Voov, Google hangout, etc. provide viable solutions for sharing screens. These platforms are configured to capture the view of the host's screen, compress the view, and transmitting the compressed view to the viewer devices through a server. This approach works well when the data volume is small, such as when the parties do not require high-resolution views or video quality. However, the performance of the view sharing on these platforms decreases when the file size or image resolution increases or the network becomes more congested. More importantly, the resolution of the view on the viewer devices is limited by the maximum resolution supported by the platforms, which is usually 1080p with an optimal network connection. If the host tries to share with the viewers an ultra-high-resolution video, 3D imaging, or image (GB or even TB in file size, such as a complete image of a glass slide created at 40× magnification with billions of pixels) and wishes the viewers have views of the same or similar resolution, the above-mentioned platforms may very likely be inadequate and incompetent. Even if the platform-imposed resolution limit is relaxed, sharing high-resolution views will still lead to high latencies because of the massive volume of data to be captured, compressed, and transferred.

The second type of existing technologies for view sharing involves transferring the digital files directly to viewer devices for the viewers to view locally. This approach requires a high upfront data transferring and storing cost to exchange for the benefit of subsequent low-latency views. However, there are several issues with this approach. For example, transferring and storing ultra-high-resolution files of GB or even TB in file size is extremely costly. Furthermore, hosts in some cases prefer sharing only some views of a digital file with viewers rather than the entire digital file for privacy or intellectual property reasons.

This disclosure describes a novel way for sharing views of large digital files, such as ultra-high-resolution images or files, videos (e.g., 4K or 8K videos), virtual tours, etc. between a host and viewers with minimal data transferring and optimal view synchronization between the host and the viewers.

SUMMARY

Various embodiments of the present specification may include systems, methods, and non-transitory computer-readable media for view sharing among a host device and viewer devices.

According to a first aspect, a method for sharing views of digital files is provided. The method may be implemented by a host computer device sharing the digital files with one or more viewer devices. An example method may include: generating, by a host computer device, a plurality of content blocks of a digital file and uploading the plurality of content blocks to one or more servers for storage; determining, by the host computer device, one or more of the plurality of content blocks representing a view of the digital file to share with one or more viewer computer devices; transmitting, by the host computer device, storage addresses of the one or more determined content blocks to the one or more viewer computer devices for the one or more viewer computer devices to retrieve the one or more determined content blocks from the one or more servers based on the storage addresses; executing, by the host computer device, one or more host commands to the one or more determined content blocks on the host computer device for managing the view of the digital file; and transmitting, by the host computer device, the one or more host commands to the one or more viewer computer devices for execution, thereby synchronizing the view of the digital file between the one or more viewer computer devices and the host computer device.

In some embodiments, the method may further include receiving, by the host computer device, a request for presenting from one of the one or more viewer computer devices; upon approval of the request, receiving, by the host computer device, one or more viewer commands from the one viewer computer device for managing the view of the digital file; executing, by the host computer device, the one or more viewer commands on the one or more determined content blocks stored in the host computer device, thereby synchronizing the view of the digital file between the one or more viewer computer devices and the host computer device; and forwarding, by the host computer device, the one or more viewer commands to other viewer computer devices for synchronization.

In some embodiments, the method may further include receiving, by the host computer device, a request for presenting from one of the one or more viewer computer devices; upon approval of the request, receiving, by the host computer device, identifiers of a subset of the one or more determined content blocks and one or more viewer commands from the one viewer computer device; identifying, by the host computer device, the subset of the one or more determined content blocks on the host computer device based on the identifiers and executing the one or more viewer commands on the subset; and forwarding, by the host computer device, the identifiers and the one or more viewer commands to other viewer computer devices.

In some embodiments, the method may further include transmitting, by the host computer device to the viewer computer device, a solo-mode starting command allowing the viewer computer device to execute viewer commands managing the one or more determined content blocks without synchronizing with the host computer device or another viewer computer device.

In some embodiments, the method may further include transmitting, by the host computer device to the viewer computer device, a solo-mode ending command for the viewer computer device to execute the one or more host commands and re-synchronize with the host computer device.

In some embodiments, the one or more host commands managing the view of the digital file comprises at least one of: a zoom command; a rotation command; an annotation command; a navigation command; a command to add an object to the view of the digital file; or a command to delete or adjust an object in the view of the digital file.

In some embodiments, the generating the plurality of content blocks of the digital file includes: generating, by the host computer device, a plurality of versions of the digital file; and generating, by the host computer device, a plurality of content blocks based on the plurality of versions of the digital file.

In some embodiments, the digital file comprises an ultra-high resolution image, and the generating the plurality of versions of the digital file comprises: downsampling the ultra-high resolution image to obtain one or more downsampled images with resolutions lower than an original resolution of the ultra-high resolution image.

In some embodiments, the generating the plurality of content blocks of the digital file comprises: generating one or more first content blocks based on the ultra-high resolution image; generating one or more second content blocks based on the one or more downsampled images; and aggregating the one or more first content blocks and the one or more second content blocks to form the plurality of content blocks of the digital file.

In some embodiments, the digital file comprises a deck of slides, and the generating the plurality of content blocks of the digital file comprises: mapping the deck of slides into an ultra-high resolution image according to a host-defined configuration, wherein the host-defined configuration comprises an location and a size of each slide; and generating the plurality of content blocks based on the ultra-high resolution image.

In some embodiments, the digital file comprises a video, and the generating the plurality of content blocks of the digital file comprises: segmenting the video into a plurality of video clips based on a host-defined clip length; and generating the plurality of content blocks of the video based on the plurality of video clips.

In some embodiments, the one or more host commands managing the view of the digital file comprises at least one of: a pause command; a resume command; a command for configuring starting time; or a command for configuring a playback speed.

In some embodiments, the digital file comprises a virtual tour, and the generating the plurality of content blocks of the digital file comprises: generating a plurality of 360-degree photos for each scene of the virtual tour; and generating the plurality of content blocks based on the plurality of 360-degree photos.

In some embodiments, the one or more servers comprise one or more content block storage servers and one or more command synchronization servers that are geographically distributed.

According to another aspect, another method for sharing views of digital files is provided. The method may be implemented by a host computer device sharing the digital files with one or more viewer devices. An example method may include: receiving, by a viewer computer device from a host computer device, one or more storage addresses of one or more content blocks representing a view of a digital file, wherein the one or more storage addresses correspond to the one or more content blocks in a server, and the one or more content blocks are a subset of a plurality of content blocks generated based on the digital file; retrieving, by the viewer computer device from the server, the one or more content blocks based on the one or more storage addresses; and receiving, by the viewer computer device from the host computer device, one or more host commands executed on the host computer device for managing a view of the digital file; and executing, by the viewer computer device, the one or more host commands on the one or more retrieved content blocks for synchronizing the view of the digital file between the viewer computer device and the host computer device.

In some embodiments, the method further includes: transmitting, by the viewer computer device to the host computer device, a request for presenting; upon receiving an approval of the request from the host computer device, executing, by the viewer computer device, one or more viewer commands on the one or more retrieved content blocks to manage the view of the digital file; and transmitting, by the viewer computer device, the one or more viewer commands to the host computer device for the host computer device to execute the one or more viewer commands.

In some embodiments, the method further includes: transmitting, by the viewer computer device to the host computer device, a request for presenting; upon receiving an approval of the request from the host computer device, one or more viewer commands on a subset of one or more retrieved content blocks; and transmitting, by the viewer computer device, identifiers of the subset of the one or more retrieved content blocks and the one or more viewer commands to the host computer device for the host computer device to execute the one or more viewer commands on content blocks corresponding to the identifiers.

In some embodiments, the method further includes: receiving, by the viewer computer device, a solo-mode starting command; and executing, by the viewer computer device, one or more viewer commands on the one or more retrieved content blocks without synchronizing with the host computer device or another viewer computer device.

In some embodiments, the plurality of content blocks representing the digital file are generated by: generating a plurality of versions of the digital file; and generating a plurality of content blocks based on the plurality of versions of the digital file.

In some embodiments, the digital file comprises an ultra-high resolution image, and the generating the plurality of versions of the digital file comprises: downsampling the ultra-high resolution image to obtain one or more downsampled images with resolutions lower than an original resolution of the ultra-high resolution image.

In some embodiments, the generating the plurality of content blocks of the digital file comprises: generating one or more first content blocks based on the ultra-high resolution image; generating one or more second content blocks based on the one or more downsampled images; and aggregating the one or more first content blocks and the one or more second content blocks to form the plurality of content blocks of the digital file.

In some embodiments, the digital file comprises a deck of slides, and the plurality of content blocks are generated by: mapping the deck of slides into an ultra-high resolution image according to a host-defined configuration, wherein the host-defined configuration comprises an location and a size of each slide, and generating the plurality of content blocks based on the ultra-high resolution image.

In some embodiments, the digital file comprises a video, and the plurality of content blocks are generated by: splitting the video into a plurality of video clips based on a host-defined clip length; and generating the plurality of content blocks of the video based on the plurality of video clips.

In some embodiments, the digital file comprises a virtual tour, and the plurality of content blocks are generated by: generating a plurality of 360-degree photos for each scene of the virtual tour; and generating the plurality of content blocks based on the plurality of 360-degree photos.

In some embodiments, the one or more servers comprise one or more content block storage servers and one or more command synchronization servers that are geographically distributed.

In some embodiments, the one or more host commands comprise at least one of: a zoom command; a rotation command; an annotation command; a navigation command; a command to add an object to the view of the digital file; or a command to delete or adjust an object in the view of the digital file.

According to yet another aspect, a computer system is provided. The computer system may comprise one or more processors and one or more non-transitory computer-readable memories coupled to the one or more processors and configured with instructions executable by the one or more processors to cause the computer system to perform the above-described methods.

According to still another aspect, a non-transitory computer-readable storage medium is provided. The non-transitory computer-readable storage medium may be configured with instructions executable by one or more processors to cause the one or more processors to perform the above-described methods.

Embodiments disclosed in the specification have a plurality of technical effects. In some embodiments, a host device (e.g., a computer or smart device) may generate a plurality of content blocks based on a digital file for view sharing. Such digital file may include ultra-high resolution images/photos, videos, slides, virtual tours, etc. The content blocks may be generated to represent different versions of the digital file. For example, assuming the digital file is an ultra-high resolution image, the content blocks may be collected from a plurality of versions of the image at different resolution levels. This way, a first subset of the content blocks may represent the image at its highest resolution, a second subset of the content blocks may represent the image at a lower resolution level, and a third subset of the content blocks may represent the image at its lowest resolution level. This content block-based representation of the digital image allows viewers to obtain content blocks of interest as a batch, and view the digital image at different resolutions by directly reading the corresponding content blocks without performing image compressing or decompressing.

In some embodiments, these content blocks may be uploaded to and stored in one or more geographically distributed servers. When the host tries to share a view of the digital file, such as a portion of an ultra-high resolution imaging, the storage addresses of the content blocks corresponding to the portion may be determined by the host device. The "storage addresses" may refer to some identifiers (e.g., hash values, or offsets and lengths) indicating where the content blocks are stored in the servers. The host may then transmit these storage addresses to the viewers for the viewers to retrieve the content blocks from the servers. During this process, the viewers may select the server(s) in its close proximity (thus with the optimal data transfer rate) to retrieve the content blocks. When the host needs to operate the view of the portion of the ultra-high resolution image and synchronize with the viewers, the host may execute host commands (e.g., zoom in/out, rotation, annotation, navigating, adding, deleting, adjusting objects in the imaging) against the content blocks on the host device and transmit the host commands to the viewers for execution against the content blocks stored in the viewer devices.

The embodiments described herein offer at least three technical advantages. First, the host does not need to capture, compress, and transmit the views of the digital files (in the form of screenshots) during a view-sharing session in real-time to the viewers. Instead, the host may preprocess the digital files to generate and upload the content blocks to servers. During the view-sharing session, the data transmission from the host to the viewers includes the storage addresses of the content blocks of interest. Since the storage addresses are small in data volume, the communication burden between the host and the viewers is significantly reduced. In addition, the host can select only the content blocks of interest to share rather than the entire digital file. Second, each viewer may determine one or more servers based on geographic proximity to retrieve the content blocks. This way, the network traffic among the geographically distributed servers is effectively distributed, and the viewers can obtain the content blocks from the servers with the fastest network connections. Third, the host can manage the view of the digital file during a view sharing session by executing corresponding host commands and transmit these host commands to the viewers. Since both the host and the viewers have already stored the content blocks locally, the view synchronization between the host and the viewers can be easily achieved by the viewers executing the same host commands against the content blocks stored on the viewer devices. The host commands are small data packages that can be easily handled, and thereby minimizing the data transferring burden and the synchronization delay between the host and the viewers.

In some embodiments, the host may allow some or all of the viewers to enter a solo-mode, in which a viewer may freely execute viewer commands against the content blocks retrieved from the servers based on the storage addresses transmitted from the host. It means, the host may specify a portion of an image or video to be shared with the viewer, and the viewer may freely manage the views but strictly within the portion of the image, such as zoom in/out or annotation for self-learning or self-exploring. This is not supported by today's screen-sharing-based platforms where the host and the viewers have to be completely in sync.

These and other features of the systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the

BRIEF DESCRIPTION OF THE DRAWINGS

FIG. 5 illustrates another exemplary method for optimized view sharing in accordance with some embodiments.

DETAILED DESCRIPTION

This specification describes various embodiments for optimizing the performance of view sharing of digital files and offering new features that are not readily available in existing solutions. The description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present specification. Thus, the specification is not limited to the embodiments shown but is to be accorded the widest scope consistent with the principles and features disclosed herein.

Figure 1:
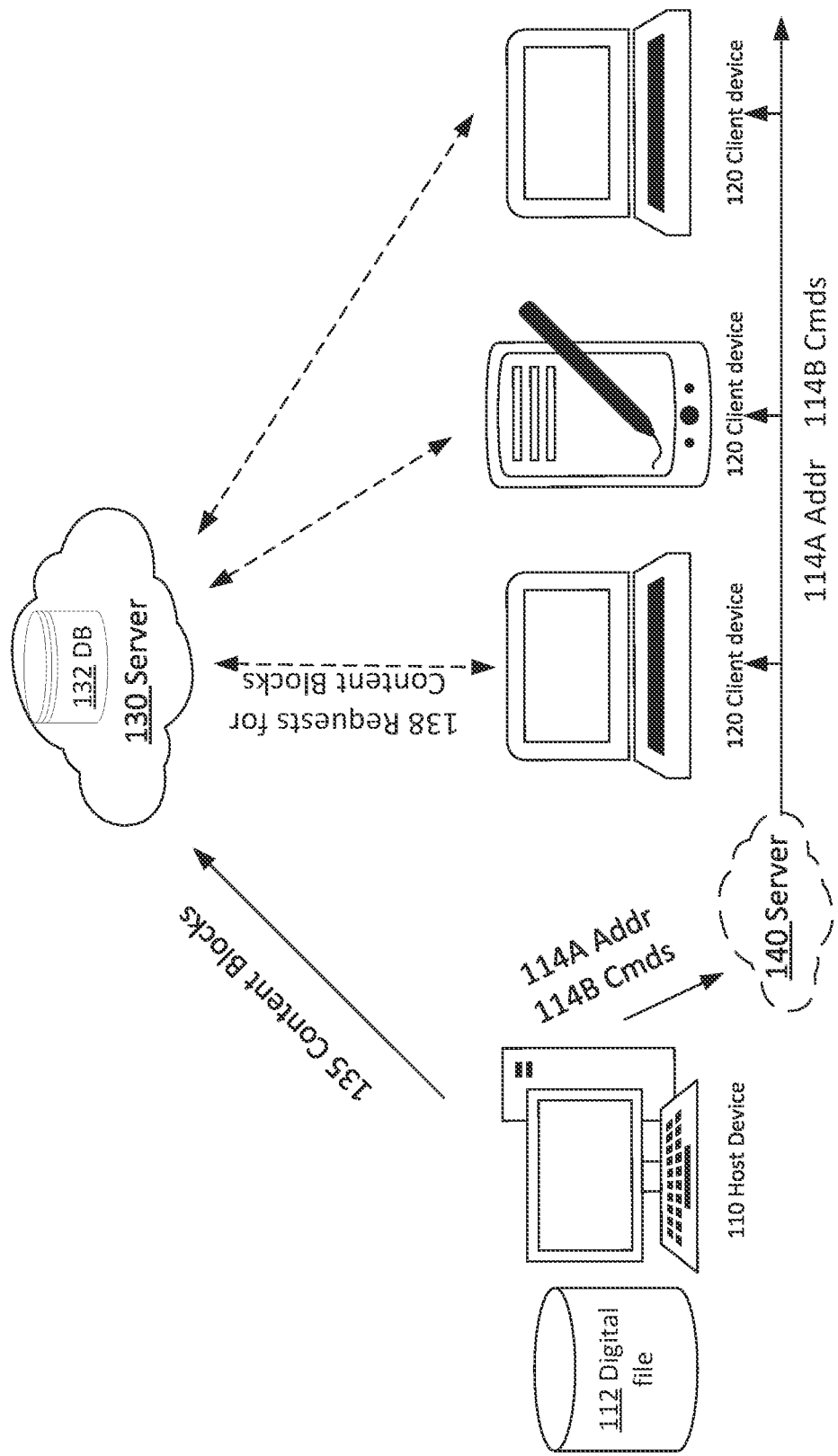
FIG. 1 illustrates an exemplary environment for optimized view sharing in accordance with some embodiments.

FIG. 1 illustrates an exemplary environment for optimized view sharing in accordance with some embodiments. The exemplary framework involves a host device 110, one or more client devices 120, and a server 130, communicating via communication channels. The host device 110 may also be referred to as the presenter, and the client devices 120 may also be referred to as the viewers.

In some embodiments, the server 130 may include a computing system or a computing device. Although one server 130 is shown in FIG. 1, any number of computing devices may work collectively and be treated as the server 130. The server 130 may be implemented in one or more networks (e.g., enterprise networks), one or more endpoints, one or more data centers, or one or more clouds. The server 130 may include hardware and/or software that manages access to a centralized resource or service in a network. A cloud may include a cluster of servers and other devices distributed across a network. In some embodiments, the server 130 may include one or more servers that are geographically distributed to provide fast delivery of content blocks or fast synchronization, e.g., through a Content Delivery Network (CDN) like Amazon CloudFront.

In some embodiments, the host device 110 and the client device 120 may include various types of terminal devices, such as a mobile phone, a tablet, a server, a cluster of servers, a desktop computer, a laptop computer, etc. The server 130 may communicate with the host and client devices, and other computing devices. Communication between devices may occur over the internet, through a local network (e.g., LAN), through direct communication (e.g., BLUETOOTH™, radio frequency, infrared), etc.

In some embodiments, the host device 110 may possess a digital file 112 to be view-shared with the client devices 120 in a synchronized way, e.g., both the presenter and the viewers share the same view of the digital file 112. The view of the digital file 112 may include a subset of the digital file 112, such as a portion of an ultra-high resolution Whole Slide imaging (WSI) with megapixels, a portion of an ultra-high resolution video, a portion of a virtual tour video, a portion of a collage of digital images, or another suitable data. In some embodiments, the host device may generate a plurality of content blocks 135 based on the digital file 112 to represent different versions of the digital file 112. For instance, some of the content blocks 135 may be generated to represent the digital file 112 at its highest resolution, while some other content blocks 135 may be generated to represent the digital file 112 at its lowest resolution. In some embodiments, the plurality of content blocks 135 may be generated by splitting the digital file 112 into small chunks.

The content blocks 135 may be transmitted to the server 130 to be stored in a database 132. The database 132 may be within or detached from the server 130. In some embodiments, if the server 130 includes multiple geographically located servers, the content blocks 135 may be copied to all the servers for distributed storage.

When the host device 110 is to share a view of the digital file 112, it may first determine the content blocks corresponding to the view. For example, if the view of the digital file 112 is a portion of an ultra-high resolution image, the corresponding content blocks may include the content blocks representing the portion at different resolution levels (e.g., the highest resolution, the lower resolution, the lowest resolution). The host device 110 may then determine the storage addresses 114A of these content blocks stored in the server 130, such as content block identifiers, combos of offsets and lengths, etc. These storage addresses 114A may be transmitted to the client devices 120. Based on the storage addresses 114A, the client devices 120 may make requests 138 to retrieve the corresponding content blocks from the server 130 and store them locally.

In some embodiments, when the host device 110 decides to manage the view of the digital file 112, it may execute the corresponding host commands 114B to, for example, zoom in/out, navigate (such as "pan" command), rotate, annotate, add/delete/adjust objects, or perform other suitable operations. These changes to the view of the digital file 112 need to be reflected on the client devices 120 with a minimized delay so that the host and the clients (viewers) have a synchronized view of the digital file 112. In some embodiments, since both the host device 110 and the client devices 120 have already stored the content blocks of interest locally, the host device 110 can simply transmit the executed host commands 114B to the client devices 120 for execution. This way, the volume of data transmitted from the host device 110 to the client device 120 is minimized by merely transmitting the storage addresses 114A and the host commands 114B, and avoiding transmitting the actual data of the digital file 112. In some embodiments, the data transmission between the host device 110 and the client devices 120 may go through one or more synchronization servers 140. The existence of the synchronization servers 140 may offer technical benefits such as easy client device management, maintenance, message tracing, etc.

Figure 2A:
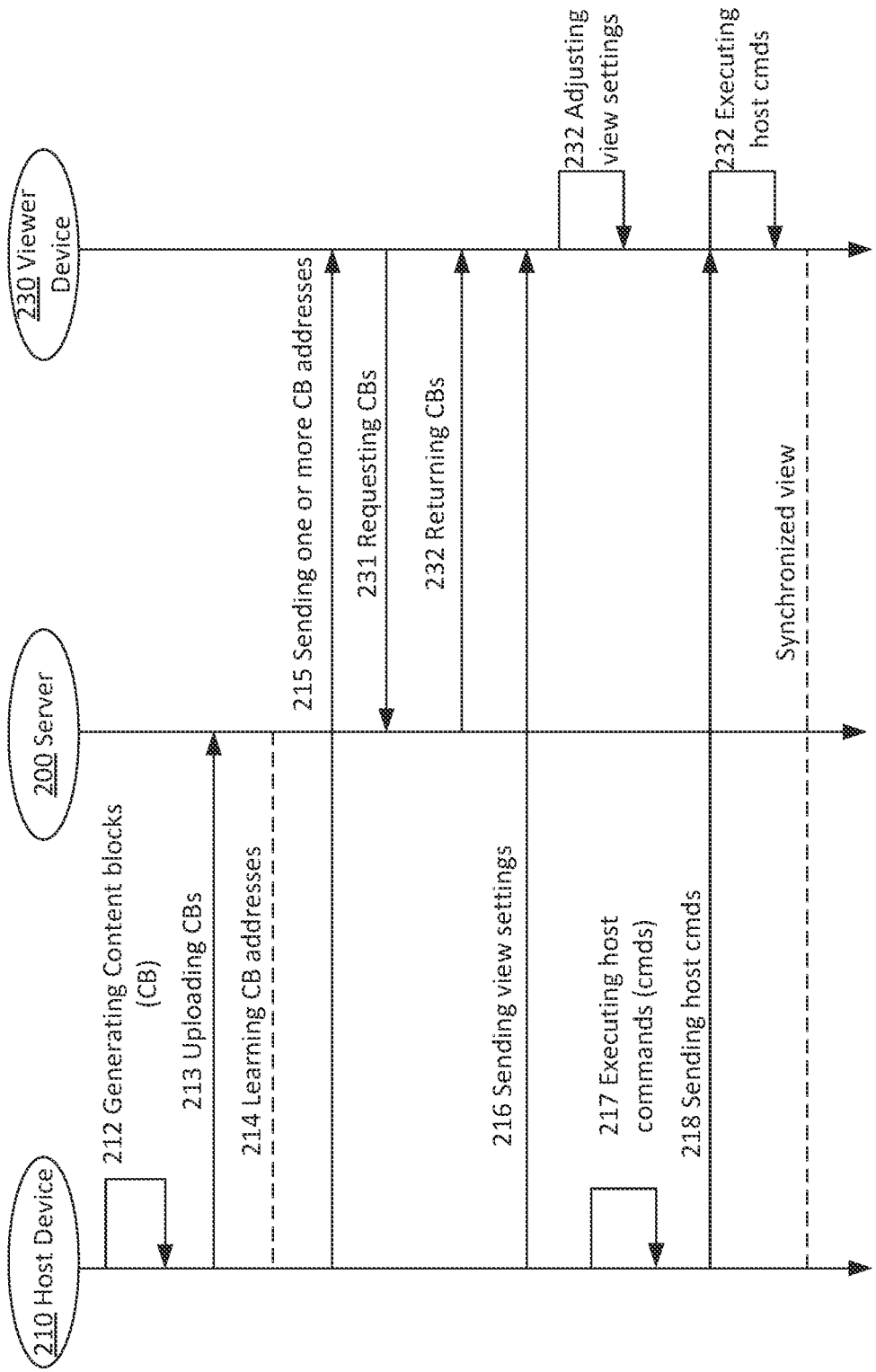
FIG. 2A illustrates an exemplary swimlane diagram for optimized view sharing in accordance with some embodiments.

FIG. 2A illustrates an exemplary swimlane diagram for optimized view sharing in accordance with some embodiments. The diagram illustrates the interaction among a host device 210, a server 200, and a viewer device 230 for view sharing with minimal data exchange and thus minimal delay. The viewer device 230 may refer to any one of the client devices 114 in FIG. 1. The steps in FIG. 2A are for illustrative purposes, which may include more, fewer, or alternative steps depending on the implementation. The steps may also be executed in various orders or in parallel.

When the host device 210 and the viewer device 230 are to perform view sharing of a digital file, in some embodiments, the host device 210 may perform preprocessing of the digital file. As shown in FIG. 2A, the host device may generate a plurality of content blocks (CBs) based on the digital file at step 212. In some embodiments, the CBs may be generated in various ways depending on the file type of the digital file. For example, if the digital file is an ultra-high-resolution image such as a Whole Slide Imaging (WSI) file with megapixels, a collage of digital arts or slides, a photo, etc., the CBs may be generated by (1) cropping the image into small chunks; (2) generating multiple versions of the small chunks at different resolution levels (e.g., the original ultra-high-resolution level and one or more lower-resolution levels); and (3) generating the CBs based on the small chunks at different resolution levels. Each small chunk may be its original size or resized. As another example, if the digital file is an ultra-high resolution image, the CBs may be generated by (1) generating multiple versions of the image at different resolution levels; (2) for each version of the image, cropping the version into small chunks; and (3) generating the CBs based on the small chunks. Yet as another example, if the digital file is a video or a virtual tour, the CBs may be generated by (1) cropping the digital file (e.g., the 360-degree videos in the virtual tour) into small clips; (2) generating multiple versions of the small clips at different resolution levels (e.g., the original ultra-high-resolution level, e.g., 8K, and one or more lower resolution levels, e.g., 4K, 1080p, 720p); and (3) generating the CBs based on the small clips. More details about the generation of CBs may refer to the description for FIG. 3.

In some embodiments, the generated CBs may be uploaded to the server 200 at step 213 for storage. When the server 200 includes a plurality of geographically distributed servers, the CB s may be replicated to each of the servers. During the process of generating and storing CBs, the host device 210 may learn the knowledge of the storage addresses of the CBs in the server 200 at step 214 via various means. For example, the server 200 may return such storage addresses of the CBs back to the host device after the CBs are stored. As another example, the host may generate a hash value for each CB using a hash algorithm and the server may retrieve the corresponding CB upon receiving the hash value. As such, the "storage addresses" here may be implemented as hash values, combos of offsets and lengths, or other suitable forms of identifiers.

After the preprocessing is finished, the host device 210 and the viewer device 230 may start the view sharing process. In some embodiments, the host device 210 may first determine a view of the digital file to share with the viewer device 230. The determined view may correspond to one or more CBs. For instance, if the host device 210 is to share a section of an ultra-high resolution Whole Slide Imaging (WSI) file with megapixels, the CBs covering the specific section may be identified by the host device. The CB s may include the section of the imaging at different resolution levels. Once the CBs are identified, the host device 210 may send the corresponding storage addresses to the viewer device 230 at step 215. The storage addresses are metadata information that are usually small in size. The viewer device 230 may subsequently request for the CBs based on the storage addresses received from the host device 210 at step 231. For instance, if the server 200 includes a plurality of geographically distributed servers managed by a Content Delivery Network (CDN), the viewer device 230 may send the requested CB storage addresses to the CDN (e.g., via a web address of the CDN). The CDN may automatically identify one or more servers in the closest proximity to the viewer device 230 or having the fastest transferring rate from/to the viewer device 230, and then forward the DB storage addresses to the identified servers to request for the corresponding CBs Based on the CB storage addresses, the server 200 may return the requested CBs to the viewer device 230.

At this point, both the host device 210 and the viewer device 230 possess the CBs corresponding to the view of the digital file to be shared. In some embodiments, the host device 216 may configure the view settings by executing corresponding view-setting commands (e.g., navigating, zooming, rotating). These view-setting commands may then be transmitted to the viewer device 230 at step 216. The viewer device 230 may execute the same view-setting commands locally to synchronize its view settings with the view settings of the host device 210 at step 232.

During the view sharing process, the host device 210 may also manage the view of the digital file by executing corresponding host commands at step 217. The host commands may include a zoom command, a rotation command, an annotation command, a navigation command (such as a pan command), a command to add an object to the view of the digital file, or a command to delete or adjust an object in the view of the digital file, another suitable command, or any combination thereof. For example, the host may adjust the view, add new content (annotation, etc.) to the view, delete or adjust objects in the view. These view management actions may be promptly synchronized to the viewer device by transmitting the host commands executed by the host device 210 to the viewer device 230 at step 218. The host commands are small data packages and thus the data transmission may merely cause minimal delay. The viewer device 230 may then execute the host commands against the CBs stored locally at step 232, thereby synchronizing the view between the host device 210 and the viewer device 230.

In the embodiments described above, the data transfer between the host device 210 and the viewer device 230 is minimized to include only the CB storage addresses, viewer setting commands, and host commands, which effectively minimizes the delay before the views on the host device 210 and the viewer device 230 are synchronized. This approach provides at least two technical improvements over the existing live-meeting platforms that relied on capturing screenshots, compressing screenshots, and transmitting screenshots in real-time. First, the resolution of the screenshots is limited by the maximum resolution supported by either the host's screen or the live-meeting platforms, which may be nowhere close to the original ultra-high resolution of the digital file. In contrast, the resolution of the shared views in the above-described embodiments is not limited by these factors. Second, if the live-meeting platforms increase the resolution of the screenshots to the maximum, such as 4K, the amount of data to be transferred grows. It means the delay before synchronization will increase as well. In the embodiments described above, the amount of data transfer is minimized and is irrelevant to the resolution of the views, which provides a much smooth view sharing and low latency.

In some embodiments, the host device 210 may directly upload the original ultra-high resolution images/videos/virtual tour files to the server 200. The server 200 may generate the CBs based on the uploaded files and send the corresponding CB storage addresses back to the host device 210. For example, the host device 210 may refer to a browser or a local API offering interfaces for uploading the ultra-high-resolution files (e.g., like Software as a Service framework), and the server 200 (e.g., a cloud server) does the heavy lifting (e.g., the CB generation). This way, the host device 210 does not have to be equipped with extensive computing resources, and thus the entire workflow shown in FIG. 2A may be easier deployable in edge computing environments (e.g., with the host device 210 and viewer device 230 as edge devices).

Figure 2B:
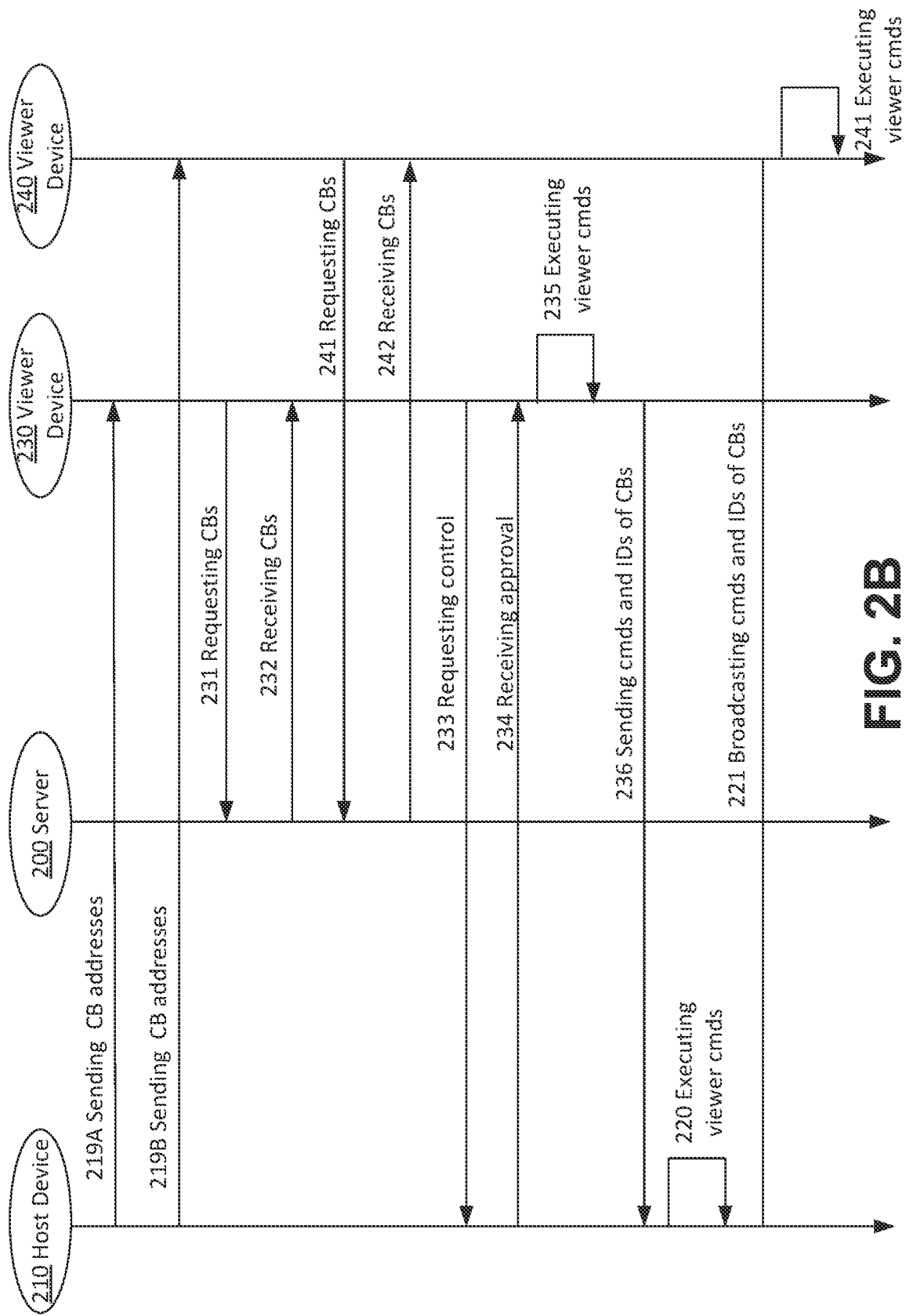
FIG. 2B illustrates another exemplary swimlane diagram for optimized view sharing in accordance with some embodiments.

FIG. 2B illustrates another exemplary swimlane diagram for optimized view sharing in accordance with some embodiments. The diagram illustrates the interaction among a host device 210, a server 200, and viewer devices 230 and 240 for view sharing with minimal data exchange and thus minimal delay. In the diagram of FIG. 2B, the viewer device 230 takes the control of the view sharing. The steps in FIG. 2B are for illustrative purposes, which may include more, fewer, or alternative steps depending on the implementation. The steps may also be executed in various orders or in parallel. For simplicity, the preprocessing steps illustrated in FIG. 2A such as 212-214 are omitted in FIG. 2B.

In some embodiments, the host device 210 may initiate a view sharing session by sending the storage addresses of CB s of interest to the viewer devices 230 and 240 at steps 219A and 219B respectively. The viewer devices 230 and 240 may request the CBs from the server 200 at steps 231 and 241, respectively, and receive the CBs at steps 232 and 242, respectively. This way, both viewer devices 230 and 240 possess the CBs of the view of the digital file that the host device 210 shares.

In some cases, during the view sharing session, one viewer device may request to lead the view sharing. For example, when a professor (host) shares a view of Whole Slide Imaging (WSI) file with megapixels during a class, a student (viewer) may want to ask questions about a particular portion of the image. In this case, the student (viewer) may request to take the control of the view sharing. Once the professor (host) approves the request, the student (viewer) may present the particular portion of the image to the professor (host) and other fellow students (viewers) and perform various operations against the view such as zoom in/out, pan/navigate left/right/up/down, rotate, annotate, add/delete/adjust objects, etc.

As shown in FIG. 2B, the viewer device 230 makes a request for control or a request for presenting at step 233, and the host device 210 approves the request at step 234. After being approved, the viewer device 230 may lead the view sharing and execute viewer commands to manage the view being shared. It may be noted that the viewer device 230 may only execute the viewer commands against the content blocks that are identified by the host device 210 and retrieved from the server 200, but not any other portions of the digital file.

In some embodiments, once the viewer device 230 executes the viewer commands against some of the CBs locally stored, it may send these viewer commands and identifiers of the CBs to the host device 210. The host device 210 may execute these viewer commands against its locally stored CBs at step 220 to synchronize with the viewer device 230. In addition, the host device 210 may broadcast the viewer commands and the identifiers of the CBs to other viewer devices such as viewer device 240. The viewer device 240 may similarly execute the viewer commands against its locally stored CBs to synchronize with the host device 210 and the viewer device 230.

Figure 2C:
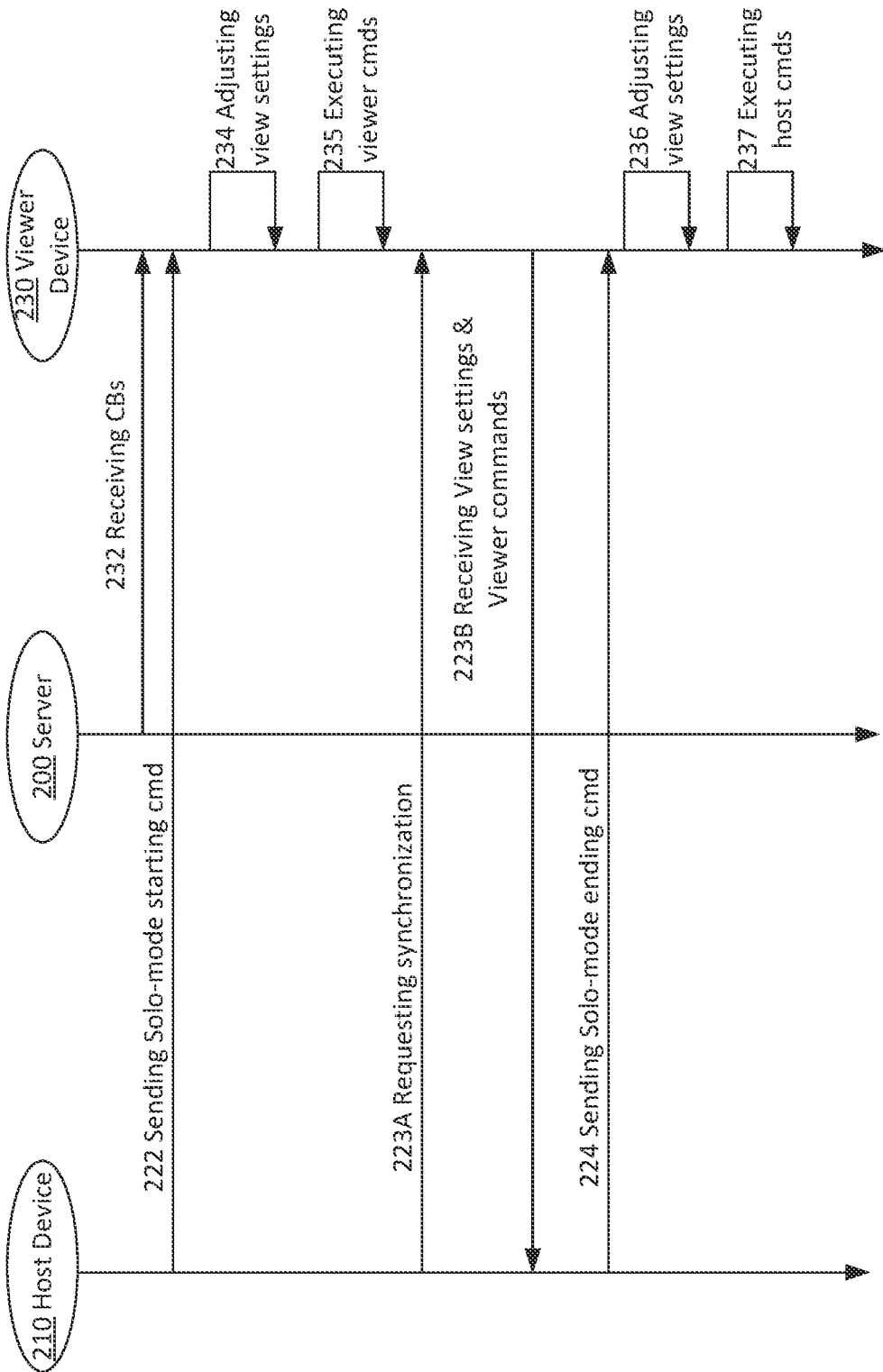
FIG. 2C illustrates yet another exemplary swimlane diagram for optimized view sharing in accordance with some embodiments.

FIG. 2C illustrates yet another exemplary swimlane diagram for optimized view sharing in accordance with some embodiments. The diagram illustrates the interaction among a host device 210, a server 200, and a viewer device 230 for view sharing with minimal data exchange and thus minimal delay. In the diagram of FIG. 2C, the viewer device 230 enters a solo-mode that is granted by the host device 210. While the viewer device 230 is in the solo mode, the view synchronization between the host device 210 and the viewer device is temporarily suspended, and the viewer device 230 may manage the view shared by the host device 210 freely. The steps in FIG. 2C are for illustrative purposes, which may include more, fewer, or alternative steps depending on the implementation. The steps may also be executed in various orders or in parallel. For simplicity, the preprocessing steps illustrated in FIG. 2A (e.g., 212-215) are omitted in FIG. 2C.

In some embodiments, after the viewer device 230 requested and received the CBs from the server 200 based on the CB storage addresses received from the host device 210 at step 232, the host sharing the view of a digital file may allow viewers to freely browse or manage the shared view. Using the same example where a professor (host) shares a view (e.g., a portion or a section) of a Whole Slide Imaging (WSI) file with megapixels during a class, the professor may specify a portion of the image for students to freely explore. As shown in FIG. 2C, the host device may send a solo-mode starting command to the viewer device at step 222. The viewer device 230 may then freely execute commands to adjust view settings at step 234 and/or execute viewer command at step 235 to manage the view. Noted that the "freedom of management" of the viewer device 230 is restricted to the view, i.e., the CBs, specified by the host device 210.

In some embodiments, the host device 210 may allow multiple viewers to enter the solo-mode. It means, a viewer device may manage the view setting or the view itself differently from other viewer devices at a given point in time, but all viewer devices are still under the restriction (e.g., which view is being shared) set by the host device 210.

In some embodiments, the host device 210 may request synchronization with one of the viewer devices such as viewer device 230 at step 223A. For instance, after the professor allows the students to freely browse the imaging of the WSI file, the professor may sync with one of the students for monitoring. In this case, the synchronization request 223A from the host device 210 may be unconditionally approved. In response, the host device 210 may receive the current view settings and/or viewer commands from the viewer device 230 for execution and synchronization.

At some point, the host device 210 may decide to send a solo-mode ending command to the viewer device 230 at step 224. Upon receiving such command, the viewer device 230 may need to re-establish the synchronized view with the host device 210. For instance, the viewer device 230 may store or receive the view settings and/or view management commands (collectively referred to as host commands) from the host device 210, and execute the host commands to re-sync with the host device 210.

The solo-mode view sharing functionality is not available in today's living-meeting platforms. For example, at any given time in a typical live-meeting platform, only one user is allowed to actively operating the view of the digital file. In the above-described embodiments, however, the host device 210 and the viewer devices such as 230 may operate the view of the digital file in different ways temporarily. Furthermore, the viewer devices in solo-mode are not disconnected from the host device 210 or without any restrictions. The host device 210 may specify the range or scope in which the viewer devices perform the operations freely. The host device 210 may also terminate the solo-mode by sending the solo-mode ending command.

In some embodiments, the viewer devices such as the viewer device 230 may enter a presentation mode by accessing a predetermined web address of a web server (e.g., an HTTP/HTTPS server) without the initiatives from the host device 210 (e.g., the steps 222 and 224 in FIG. 2C may be skipped). For example, the viewer device 210 may access the web address to automatically execute the starting/ending commands to enter the presentation mode and other viewer commands to configure the default views.

Figure 3:
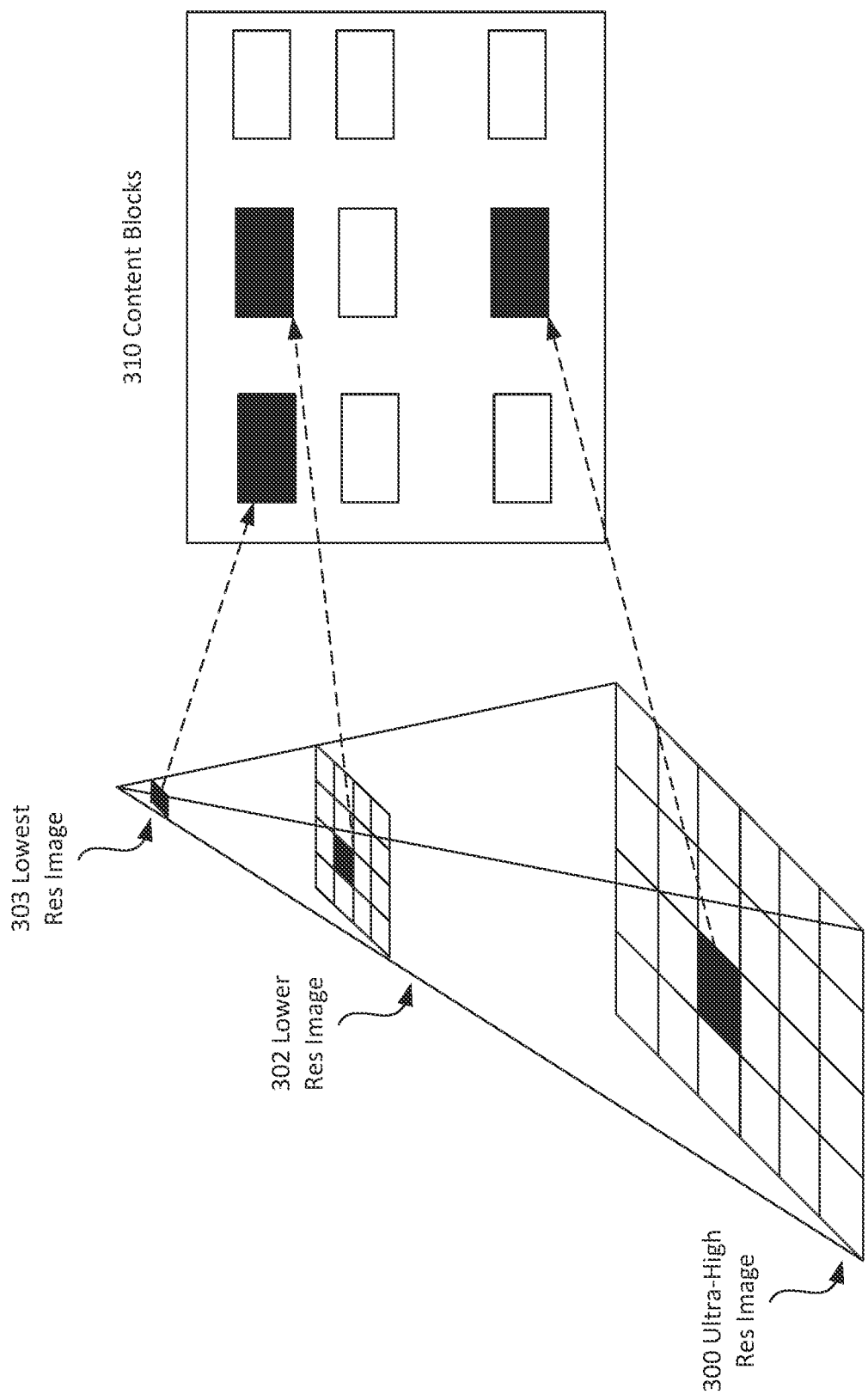
FIG. 3 illustrates an exemplary diagram for generating content blocks in accordance with some embodiments.

FIG. 3 illustrates an exemplary diagram for generating content blocks (CBs) in accordance with some embodiments. The process of generating CBs in FIG. 3 is for illustrative purposes. It may be implemented in different ways depending on the type of digital file. For simplicity, FIG. 3 shows how CBs 310 of an ultra-high resolution image 300 are generated.

As shown, the ultra-high resolution image 300 may be downsampled into one or more images with lower resolutions, such as the image 302 with a lower resolution and the image 303 with a host-defined lowest resolution. Here, "downsample" may refer to signal processing techniques (also referred to as compression or decimation) that reduce sampling rates or sampling size in order to reduce the amount of data to be transferred at the expense of the quality of the original signal. For instance, downsampling of a digital image may include the reduction in spatial resolution while keeping the same two-dimensional (2D) representation. The content blocks (CBs) 310 of the ultra-high resolution image 300 may be generated based on not only the original file (with the highest resolution) but also the downsampled images. For instance, the ultra-high resolution image 300 may be segmented into N×M chunks, with each chunk being a CB. The image 302 with a lower resolution level may be segmented into N'×M' chunks, where N'≤N and M'≤M. Similarly, the image 303 with the lowest host-defined resolution level may be segmented into N"×M" chunks, where N"≤N'≤N and M"≤M'≤M.

In some embodiments, the CBs 310 may be randomly sorted when being stored on servers (e.g., in a Content Delivery Network (CDN)). The purpose of randomly sorting is for protecting data privacy and preventing the viewers from exploring the storage pattern (e.g., the pattern of the storage addresses) of the CBs.

In some embodiments, the digital file may include a plurality of slides for presentation. In this case, the generation of CBs may start with mapping each slide into an ultra-high resolution image as a collage, and each slide may be of the original size or resized. The top-left position of each slide may be defined by the host or assigned randomly. After obtaining the ultra-high resolution image including all the slides, the CBs may be generated similarly as the way illustrated in FIG. 3.

In some embodiments, the digital file may include a video file. The video file may be segmented into a plurality of small video clips, with the length of each video clip being defined by the host, such as 10 seconds. In some embodiments, the small video clips may then be shuffled randomly and stored as the CBs on the servers. In other embodiments, each video clip may be downsampled or compressed into one or more versions with lower resolution levels. Then the different versions of the video clips may be randomly shuffled and stored as the CBs on the servers.

In some embodiments, the digital file may include a virtual tour of, for example, a museum, a house for sale, a scenic spot. To generate CBs, one or more 360-degree photos for each scene of the virtual tour may be collected. In some embodiments, these 360-degree photos may be randomly shuffled and stored as the CBs on the servers. In other embodiments, each 360-degree photo may be downsampled or compressed into one or more versions with lower resolution levels. Then the different versions of the 360-degree photos may be randomly shuffled and stored as the CBs on the servers.

The "random shuffle" step in the above-described process is to protect data privacy and prevent the viewers from exploring and learning the storage patterns (e.g., the pattern of the storage addresses) of the CBs. For example, if the CBs are arranged in a predicted way (e.g., sequentially), a viewer who has downloaded a large number of CBs may aggregate the CBs to reverse-engineer the original digital file. The "random shuffle" effectively keeps the viewers in the dark and prevents reverse-engineering the original digital files.

Figure 4:
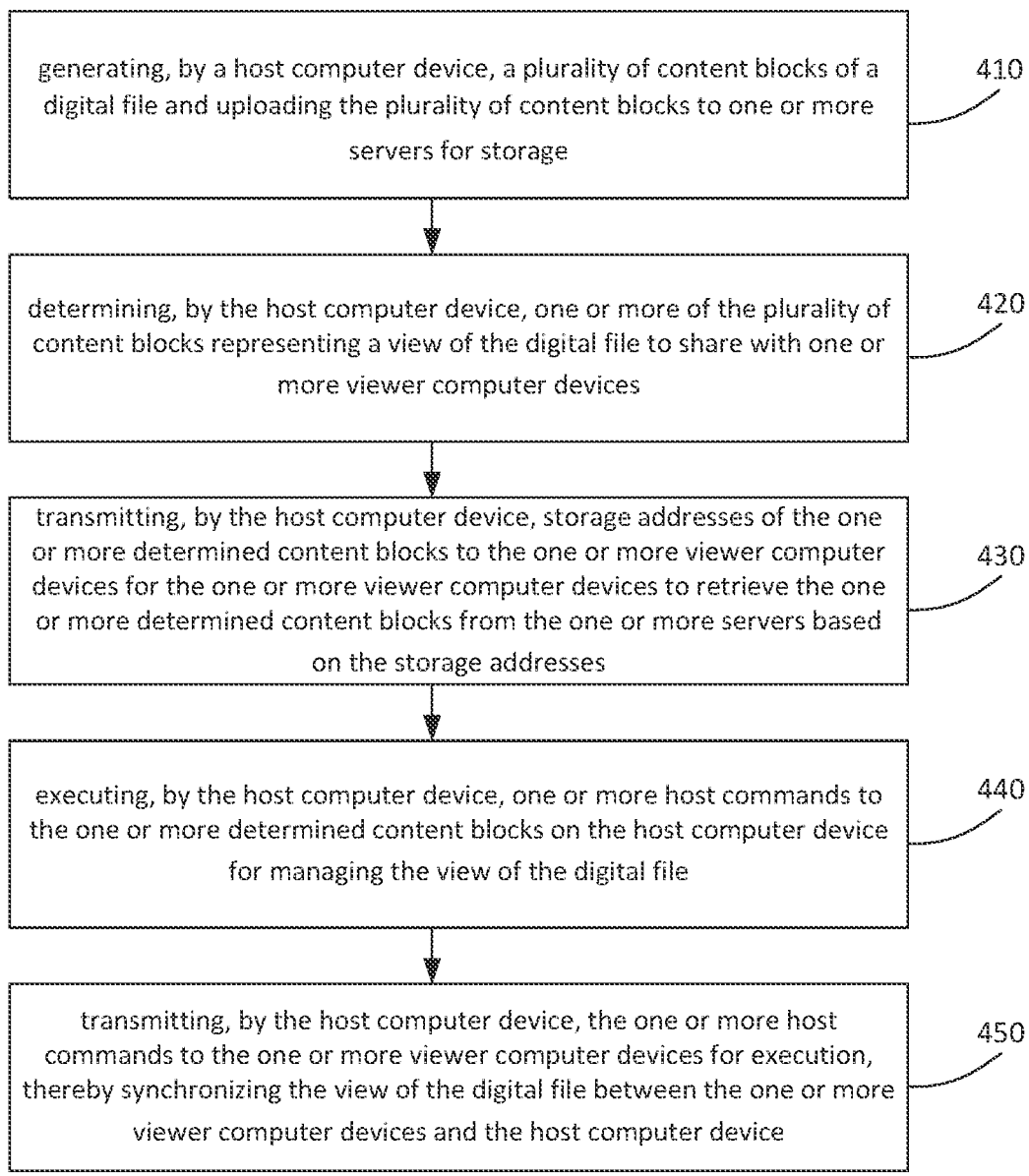
FIG. 4 illustrates an exemplary method for optimized view sharing in accordance with some embodiments.

FIG. 4 illustrates an exemplary method 400 for optimized view sharing in accordance with some embodiments. The method 400 may be performed by a computer device, apparatus, or system. The method 400 may be performed by one or more modules/components of the environment or system illustrated by FIGS. 1-3, such as the host device 110 in FIG. 1. The operations of the method 400 presented below are intended to be illustrative. Depending on the implementation, the method 400 may include additional, fewer, or alternative steps performed in various orders or parallel.

Block 410 includes generating, by a host computer device, a plurality of content blocks of a digital file and uploading the plurality of content blocks to one or more servers for storage. In some embodiments, the generating the plurality of content blocks of the digital file comprises: generating, by the host computer device, a plurality of versions of the digital file; and generating, by the host computer device, a plurality of content blocks based on the plurality of versions of the digital file.

In some embodiments, the digital file comprises an ultra-high resolution image, and the generating the plurality of versions of the digital file comprises: downsampling the ultra-high resolution image to obtain one or more downsampled images with resolutions lower than an original resolution of the ultra-high resolution image. In some embodiments, the generating the plurality of content blocks of the digital file comprises: generating one or more first content blocks based on the ultra-high resolution image; generating one or more second content blocks based on the one or more downsampled images; and aggregating the one or more first content blocks and the one or more second content blocks to form the plurality of content blocks of the digital file.

In some embodiments, the digital file comprises a deck of slides, and the generating the plurality of content blocks of the digital file comprises: mapping the deck of slides into an ultra-high resolution image according to a host-defined configuration, wherein the host-defined configuration comprises an location and a size of each slide; and generating the plurality of content blocks based on the ultra-high resolution image.

In some embodiments, the digital file comprises a video, and the generating the plurality of content blocks of the digital file comprises: segmenting the video into a plurality of video clips based on a host-defined clip length; and generating the plurality of content blocks of the video based on the plurality of video clips. In some embodiments, the one or more host commands managing the view of the digital file comprises at least one of: a pause command; a resume command; a command for configuring starting time; or a command for configuring a playback speed.

In some embodiments, the digital file comprises a virtual tour, and the generating the plurality of content blocks of the digital file comprises: generating a plurality of 360-degree photos for each scene of the virtual tour; and generating the plurality of content blocks based on the plurality of 360-degree photos.

Block 420 includes determining, by the host computer device, one or more of the plurality of content blocks representing a view of the digital file to share with one or more viewer computer devices.

Block 430 includes transmitting, by the host computer device, storage addresses of the one or more determined content blocks to the one or more viewer computer devices for the one or more viewer computer devices to retrieve the one or more determined content blocks from the one or more servers based on the storage addresses. In some embodiments, the one or more servers comprise one or more content block storage servers and one or more command synchronization servers that are geographically distributed.

Block 440 includes executing, by the host computer device, one or more host commands to the one or more determined content blocks on the host computer device for managing the view of the digital file.

Block 450 includes transmitting, by the host computer device, the one or more host commands to the one or more viewer computer devices for execution, thereby synchronizing the view of the digital file between the one or more viewer computer devices and the host computer device. In some embodiments, the one or more host commands managing the view of the digital file comprises at least one of: a zoom command; a rotation command; an annotation command; a navigation command; a command to add an object to the view of the digital file; or a command to delete or adjust an object in the view of the digital file.

In some embodiments, the method 400 may further include receiving, by the host computer device, a request for presenting from one of the one or more viewer computer devices; upon approval of the request, receiving, by the host computer device, one or more viewer commands from the one viewer computer device for managing the view of the digital file; executing, by the host computer device, the one or more viewer commands on the one or more determined content blocks stored in the host computer device, thereby synchronizing the view of the digital file between the one or more viewer computer devices and the host computer device; and forwarding, by the host computer device, the one or more viewer commands to other viewer computer devices for synchronization.

In some embodiments, the method 400 may further include receiving, by the host computer device, a request for presenting from one of the one or more viewer computer devices; upon approval of the request, receiving, by the host computer device, identifiers of a subset of the one or more determined content blocks and one or more viewer commands from the one viewer computer device; identifying, by the host computer device, the subset of the one or more determined content blocks on the host computer device based on the identifiers and executing the one or more viewer commands on the subset; and forwarding, by the host computer device, the identifiers and the one or more viewer commands to other viewer computer devices.

In some embodiments, the method 400 may further include transmitting, by the host computer device to the viewer computer device, a solo-mode starting command allowing the viewer computer device to execute viewer commands managing the one or more determined content blocks without synchronizing with the host computer device or another viewer computer device.

In some embodiments, the method 400 may further include transmitting, by the host computer device to the viewer computer device, a solo-mode ending command for the viewer computer device to execute the one or more host commands and re-synchronize with the host computer device.

FIG. 5 illustrates another exemplary method 500 for optimized view sharing in accordance with some embodiments. The method 500 may be performed by a computer device, apparatus, or system. The method 500 may be performed by one or more modules/components of the environment or system illustrated by FIGS. 1-3, such as the client device 120 in FIG. 1. The operations of the method 500 presented below are intended to be illustrative. Depending on the implementation, the method 500 may include additional, fewer, or alternative steps performed in various orders or parallel.

Block 510 includes receiving, by a viewer computer device from a host computer device, one or more storage addresses of one or more content blocks representing a view of a digital file, wherein the one or more storage addresses correspond to the one or more content blocks in a server, and the one or more content blocks are a subset of a plurality of content blocks generated based on the digital file. In some embodiments, the plurality of content blocks representing the digital file are generated by: generating a plurality of versions of the digital file; and generating a plurality of content blocks based on the plurality of versions of the digital file.

Block 520 includes retrieving, by the viewer computer device from the server, the one or more content blocks based on the one or more storage addresses.

Block 530 includes receiving, by the viewer computer device from the host computer device, one or more host commands executed on the host computer device for managing a view of the digital file.

Block 540 includes executing, by the viewer computer device, the one or more host commands on the one or more retrieved content blocks for synchronizing the view of the digital file between the viewer computer device and the host computer device.

In some embodiments, the method 500 may further include transmitting, by the viewer computer device to the host computer device, a request for presenting; upon receiving an approval of the request from the host computer device, executing, by the viewer computer device, one or more viewer commands on the one or more retrieved content blocks to manage the view of the digital file; and transmitting, by the viewer computer device, the one or more viewer commands to the host computer device for the host computer device to execute the one or more viewer commands.

In some embodiments, the method 500 may further include transmitting, by the viewer computer device to the host computer device, a request for presenting; upon receiving an approval of the request from the host computer device, one or more viewer commands on a subset of one or more retrieved content blocks; and transmitting, by the viewer computer device, identifiers of the subset of the one or more retrieved content blocks and the one or more viewer commands to the host computer device for the host computer device to execute the one or more viewer commands on content blocks corresponding to the identifiers.

In some embodiments, the method 500 may further include receiving, by the viewer computer device, a solo-mode starting command; and executing, by the viewer computer device, one or more viewer commands on the one or more retrieved content blocks without synchronizing with the host computer device or another viewer computer device.

Figure 6:
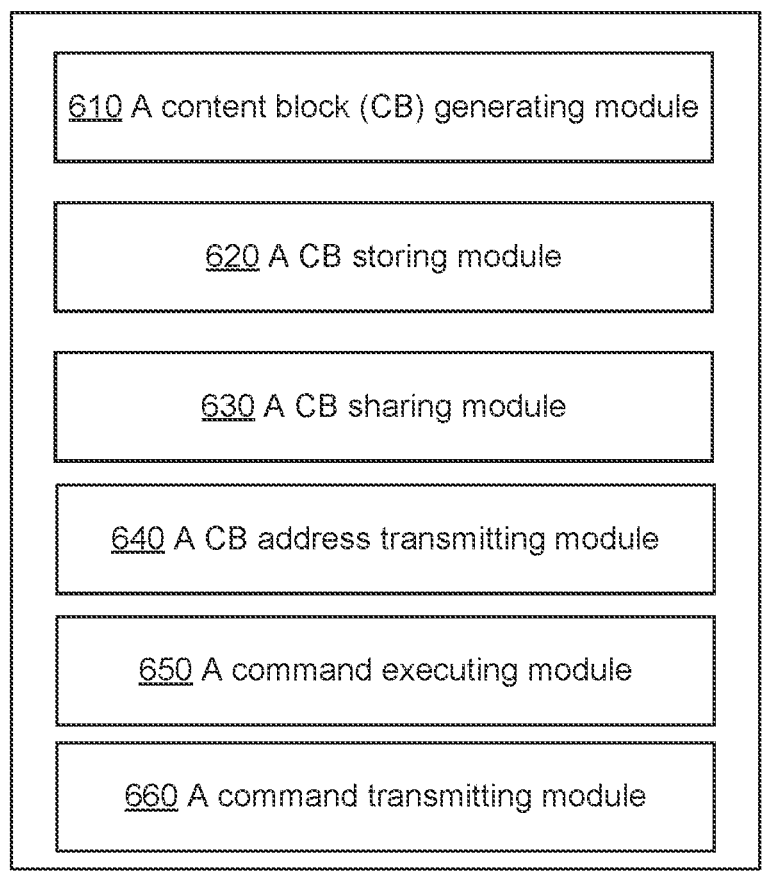
FIG. 6 illustrates a block diagram of a computer system for optimized view sharing in accordance with some embodiments.

FIG. 6 illustrates a block diagram of a computer system 600 for optimized view sharing in accordance with some embodiments. The computer system 600 may be an example of an implementation of one or more modules in FIGS. 1-5, or one or more other components illustrated in FIGS. 1-5. The methods 400 and 500 in FIGS. 4 and 5 may be implemented by the computer system 600. The computer system 600 may comprise one or more processors and one or more non-transitory computer-readable storage media (e.g., one or more memories) coupled to the one or more processors and configured with instructions executable by the one or more processors to cause the system or device (e.g., the processor) to perform the above-described method, e.g., the method 500. The computer system 600 may comprise various units/modules corresponding to the instructions (e.g., software instructions).

In some embodiments, the computer system 600 may include a content block (CB) generating module 610, a CB storing module 620, a CB sharing module 630, a CB address transmitting module 640, a command executing module 650, and a command transmitting module 660. In some embodiments, the CB generating module 610 may be configured to generate a plurality of content blocks of a digital file; the CB storing module 620 may be configured to upload the plurality of content blocks to one or more servers for storage; the CB sharing module 630 may be configured to determine one or more of the plurality of content blocks representing a view of the digital file to share with one or more viewer computer devices; the CB address transmitting module 640 may be configured to transmit storage addresses of the one or more determined content blocks to the one or more viewer computer devices for the one or more viewer computer devices to retrieve the one or more determined content blocks from the one or more servers based on the storage addresses; the command executing module 650 may be configured to execute one or more host commands to the one or more determined content blocks on the host computer device for managing the view of the digital file; and the command transmitting module 660 may be configured to transmit the one or more host commands to the one or more viewer computer devices for execution, thereby synchronizing the view of the digital file between the one or more viewer computer devices and the host computer device.

The techniques described herein may be implemented by one or more special-purpose computing devices. The special-purpose computing devices may be desktop computer systems, server computer systems, portable computer systems, handheld devices, networking devices or any other device or combination of devices that incorporate hard-wired and/or program logic to implement the techniques. The special-purpose computing devices may be implemented as personal computers, laptops, cellular phones, camera phones, smart phones, personal digital assistants, media players, navigation devices, email devices, game consoles, tablet computers, wearable devices, or a combination thereof. Computing device(s) may be generally controlled and coordinated by operating system software. Conventional operating systems control and schedule computer processes for execution, perform memory management, provide file system, networking, I/O services, and provide a user interface functionality, such as a graphical user interface ("GUI"), among other things. The various systems, apparatuses, storage media, modules, and units described herein may be implemented in the special-purpose computing devices, or one or more computing chips of the one or more special-purpose computing devices. In some embodiments, the instructions described herein may be implemented in a virtual machine on the special-purpose computing device. When executed, the instructions may cause the special-purpose computing device to perform various methods described herein. The virtual machine may include a software, hardware, or a combination thereof.

Figure 7:
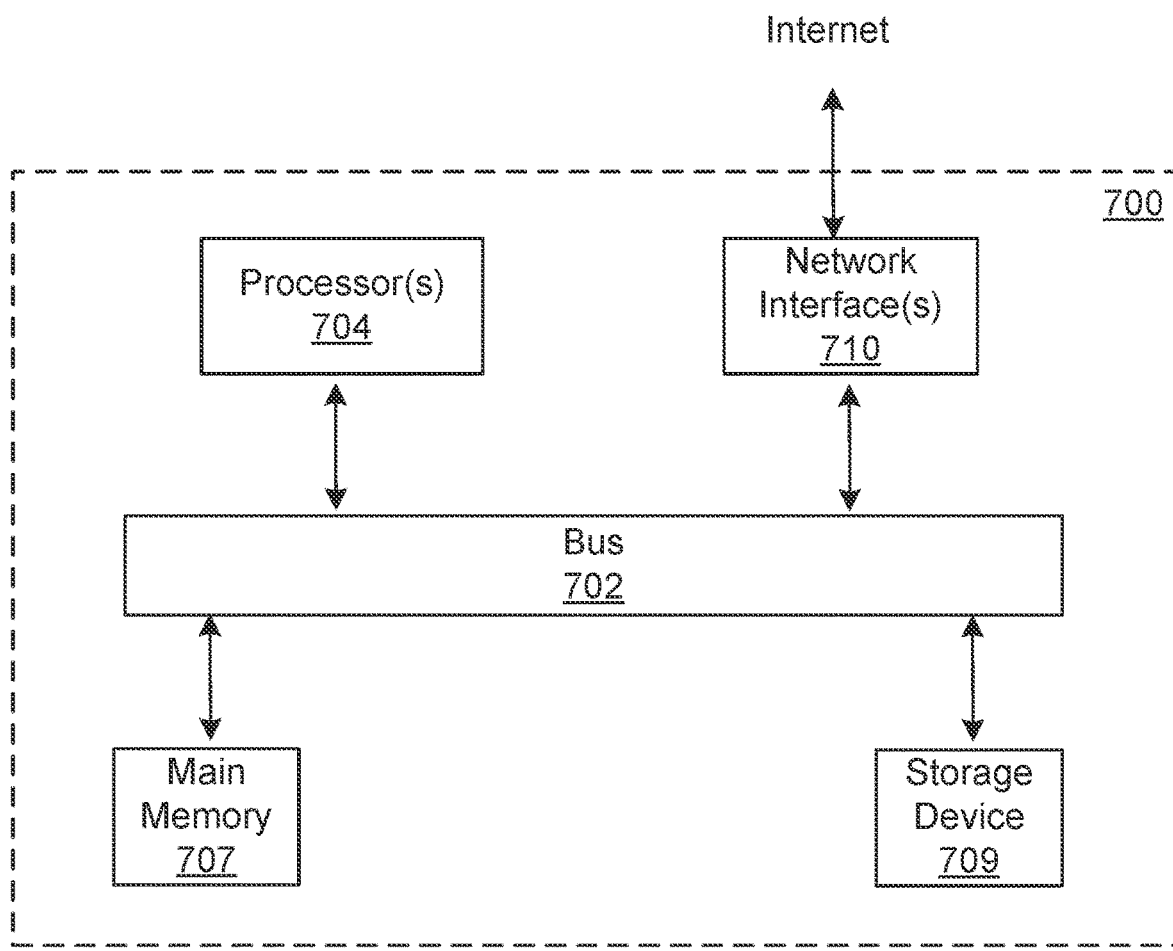
FIG. 7 illustrates an example computing device in which any of the embodiments described herein may be implemented.

FIG. 7 illustrates an example computing device in which any of the embodiments described herein may be implemented. The computing device may be used to implement one or more components of the systems and the methods shown in FIGS. 1-6 The computing device 700 may comprise a bus 702 or other communication mechanism for communicating information and one or more hardware processors 704 coupled with bus 702 for processing information. Hardware processor(s) 704 may be, for example, one or more general purpose microprocessors.

The computing device 700 may also include a main memory 707, such as a random-access memory (RAM), cache and/or other dynamic storage devices, coupled to bus 702 for storing information and instructions to be executed by processor(s) 704. Main memory 707 also may be used for storing temporary variables or other intermediate information during execution of instructions to be executed by processor(s) 704. Such instructions, when stored in storage media accessible to processor(s) 704, may render computing device 700 into a special-purpose machine that is customized to perform the operations specified in the instructions. Main memory 707 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, or networked versions of the same.

The computing device 700 may implement the techniques described herein using customized hard-wired logic, one or more ASICs or FPGAs, firmware and/or program logic which in combination with the computing device may cause or program computing device 700 to be a special-purpose machine. According to one embodiment, the techniques herein are performed by computing device 700 in response to processor(s) 704 executing one or more sequences of one or more instructions contained in main memory 707. Such instructions may be read into main memory 707 from another storage medium, such as storage device 709. Execution of the sequences of instructions contained in main memory 707 may cause processor(s) 704 to perform the process steps described herein. For example, the processes/methods disclosed herein may be implemented by computer program instructions stored in main memory 707. When these instructions are executed by processor(s) 704, they may perform the steps as shown in corresponding figures and described above. In alternative embodiments, hard-wired circuitry may be used in place of or in combination with software instructions.

The computing device 700 also includes a communication interface 710 coupled to bus 702. Communication interface 710 may provide a two-way data communication coupling to one or more network links that are connected to one or more networks. As another example, communication interface 710 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each process, method, and algorithm described in the preceding sections may be embodied in, and fully or partially automated by, code modules executed by one or more computer systems or computer processors comprising computer hardware. The processes and algorithms may be implemented partially or wholly in application-specific circuitry.

When the functions disclosed herein are implemented in the form of software functional units and sold or used as independent products, they can be stored in a processor executable non-volatile computer readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, wherein the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A computer-implemented method, comprising:
    receiving, by a viewer computer device from a host computer device, one or more storage addresses of one or more content blocks representing a view of a digital file, wherein the one or more storage addresses correspond to the one or more content blocks in a server, and the one or more content blocks are a subset of a plurality of content blocks generated based on the digital file;
    retrieving, by the viewer computer device from the server, the one or more content blocks based on the one or more storage addresses;
    receiving, by the viewer computer device from the host computer device, one or more host commands executed on the host computer device for managing a view of the digital file;
    synchronizing, by the viewer computer device, the view of the digital file between the viewer computer device and the host computer device by executing the one or more host commands on the one or more retrieved content blocks,
    receiving, by the viewer computer device from the host computer device, a solo-mode starting command;
    initiating, by the viewer computer device, a solo-mode that enables the viewer computer device to adjust a view setting of the digital file on the viewer computer device without synchronizing with the view setting of the digital file on the host computer device or any other viewer computer device, wherein the view setting comprises browsing, zooming, or rotating;
    receiving, by the viewer computer device from the host computer device, a solo-mode ending command; and
    re-syncing, by the viewer computer device, the view setting of the digital file on the viewer computer device to the view setting of the digital file on the host device.

2. The method of claim 1, further comprising:
    transmitting, by the viewer computer device to the host computer device, a request for presenting;
    upon receiving an approval of the request from the host computer device, executing, by the viewer computer device, one or more viewer commands on the one or more retrieved content blocks to manage the view of the digital file; and transmitting, by the viewer computer device, the one or more viewer commands to the host computer device for the host computer device to execute the one or more viewer commands.

3. The method of claim 1, further comprising:
transmitting, by the viewer computer device to the host computer device, a request for presenting;
upon receiving an approval of the request from the host computer device, one or more viewer commands on a subset of one or more retrieved content blocks; and
transmitting, by the viewer computer device, identifiers of the subset of the one or more retrieved content blocks and the one or more viewer commands to the host computer device for the host computer device to execute the one or more viewer commands on content blocks corresponding to the identifiers.

4. The method of claim 1, wherein the plurality of content blocks representing the digital file are generated by:
generating a plurality of versions of the digital file; and
generating a plurality of content blocks based on the plurality of versions of the digital file.

5. The method of claim 4, wherein the digital file comprises an ultra-high resolution image, and the generating the plurality of versions of the digital file comprises:
downsampling the ultra-high resolution image to obtain one or more downsampled images with resolutions lower than an original resolution of the ultra-high resolution image.

6. The method of claim 5, wherein the generating the plurality of content blocks of the digital file comprises:
generating one or more first content blocks based on the ultra-high resolution image;
generating one or more second content blocks based on the one or more downsampled images; and
aggregating the one or more first content blocks and the one or more second content blocks to form the plurality of content blocks of the digital file.

7. The method of claim 1, wherein the digital file comprises a deck of slides, and the plurality of content blocks are generated by:
mapping the deck of slides into an ultra-high resolution image according to a host-defined configuration, wherein the host-defined configuration comprises an location and a size of each of the slides, and
generating the plurality of content blocks based on the ultra-high resolution image.

8. The method of claim 1, wherein the digital file comprises a video, and the plurality of content blocks are generated by:
splitting the video into a plurality of video clips based on a host-defined clip length; and
generating the plurality of content blocks of the video based on the plurality of video clips.

9. The method of claim 1, wherein the digital file comprises a virtual tour, and the plurality of content blocks are generated by:
generating a plurality of 360-degree photos for each scene of the virtual tour; and
generating the plurality of content blocks based on the plurality of 360-degree photos.

10. The method of claim 1, wherein the one or more servers comprise one or more content block storage servers and one or more command synchronization servers that are geographically distributed.

11. The method of claim 1, wherein the one or more host commands comprise at least one of the following:
a zoom command;
a rotation command;
an annotation command;
a navigation command;
a command to add an object to the view of the digital file; or
a command to delete or adjust an object in the view of the digital file.

12. A computer system of a viewer computer device, the computer system comprising one or more processors and one or more non-transitory computer-readable memories coupled to the one or more processors and configured with instructions executable by the one or more processors to cause the system to perform operations comprising:
receiving, from a host computer device, one or more storage addresses of one or more content blocks representing a view of a digital file, wherein the one or more storage addresses correspond to the one or more content blocks in a server, and the one or more content blocks are a subset of a plurality of content blocks generated based on the digital file;
retrieving, from the server, the one or more content blocks based on the one or more storage addresses;
receiving, from the host computer device, one or more host commands executed on the host computer device for managing a view of the digital file;
synchronizing the view of the digital file between the viewer computer device and the host computer device by executing the one or more host commands on the one or more retrieved content blocks;
receiving, from the host computer device, a solo-mode starting command;
initiating a solo-mode that enables the viewer computer device to adjust a view setting of the digital file on the viewer computer device without synchronizing with the view setting of the digital file on the host computer device or any other viewer computer device, wherein the view setting comprises browsing, zooming, or rotating;
receiving, from the host computer device, a solo-mode ending command; and
re-syncing the view setting of the digital file on the viewer computer device to the view setting of the digital file on the host device.

13. The computer system of claim 12, wherein the operations further comprise:
transmitting, to the host computer device, a request for presenting;
upon receiving an approval of the request from the host computer device, executing one or more viewer commands on the one or more retrieved content blocks to manage the view of the digital file; and
transmitting the one or more viewer commands to the host computer device for the host computer device to execute the one or more viewer commands.

14. The computer system of claim 12, wherein the plurality of content blocks representing the digital file are generated by:
generating a plurality of versions of the digital file; and
generating a plurality of content blocks based on the plurality of versions of the digital file.

15. The computer system of claim 14, wherein the digital file comprises an ultra-high resolution image, and the generating the plurality of versions of the digital file comprises:
downsampling the ultra-high resolution image to obtain one or more downsampled images with resolutions lower than an original resolution of the ultra-high resolution image.

16. The computer system of claim 15, wherein the generating the plurality of content blocks of the digital file comprises:

generating one or more first content blocks based on the ultra-high resolution image;

generating one or more second content blocks based on the one or more downsampled images; and aggregating the one or more first content blocks and the one or more second content blocks to form the plurality of content blocks of the digital file.

17. The computer system of claim 12, wherein the digital file comprises a video, and the plurality of content blocks are generated by:

splitting the video into a plurality of video clips based on a host-defined clip length; and generating the plurality of content blocks of the video based on the plurality of video clips.

18. A non-transitory computer-readable storage medium of a viewer computer device, configured with instructions executable by one or more processors to cause the one or more processors to perform operations comprising:

receiving, from a host computer device, one or more storage addresses of one or more content blocks representing a view of a digital file, wherein the one or more storage addresses correspond to the one or more content blocks in a server, and the one or more content blocks are a subset of a plurality of content blocks generated based on the digital file;

retrieving, from the server, the one or more content blocks based on the one or more storage addresses;

receiving, from the host computer device, one or more host commands executed on the host computer device for managing a view of the digital file;

synchronizing the view of the digital file between the viewer computer device and the host computer device by executing the one or more host commands on the one or more retrieved content blocks;

receiving, from the host computer device, a solo-mode starting command;

initiating a solo-mode that enables the viewer computer device to adjust a view setting of the digital file on the viewer computer device without synchronizing with the view setting of the digital file on the host computer device or any other viewer computer device, wherein the view setting comprises browsing, zooming, or rotating;

receiving, from the host computer device, a solo-mode ending command; and re-syncing the view setting of the digital file on the viewer computer device to the view setting of the digital file on the host device.

* * * * *